United States Patent
Gion-Pol et al.

(10) Patent No.: US 9,250,326 B2
(45) Date of Patent: Feb. 2, 2016

(54) 3-D SENSOR WITH ADAPTIVE TRANSMITTING POWER FOR MONITORING AN AREA

(75) Inventors: Catregn Gion-Pol, Summaprada (CH); Thomas Gay, Malans (CH)

(73) Assignee: Cedes AG, Landquart (CH)

( * ) Notice: Subject to any disclaimer, the term of this patent is extended or adjusted under 35 U.S.C. 154(b) by 0 days.

(21) Appl. No.: 12/885,682

(22) Filed: Sep. 20, 2010

(65) Prior Publication Data

US 2011/0121160 A1    May 26, 2011

Related U.S. Application Data

(63) Continuation of application No. PCT/EP2009/002082, filed on Mar. 20, 2009.

(30) Foreign Application Priority Data

Mar. 20, 2008  (DE) .................. 10 2008 015 373
Jul. 10, 2008   (DE) .................. 10 2008 032 405

(51) Int. Cl.
*H01J 40/00*    (2006.01)
*G01J 1/32*     (2006.01)
(Continued)

(52) U.S. Cl.
CPC .............. *G01S 17/026* (2013.01); *G01S 7/484* (2013.01); *G01S 7/497* (2013.01); *G01S 17/89* (2013.01)

(58) Field of Classification Search
CPC ......... G01S 17/87; G01S 17/02; G01S 17/06; G01S 17/32; G01S 17/10; G01S 17/026; G01S 17/89; G01S 7/484; G01S 7/497; G05D 25/00; G03B 13/00; G03B 15/03; H04N 5/225; G01C 3/08
USPC ......... 250/221, 222.1, 214 R, 214.1, 214 VT, 250/231.1, 559.1, 559.29, 205, 559.38, 250/559.4, 201.1, 201.6; 356/5.05, 3.01, 356/3.03, 3.04, 4.01, 5.01, 6, 10, 139.1, 356/140, 141.1, 614, 623, 621, 213, 233, 356/218; 340/540, 600, 555, 556, 557, 340/545.3, 573.1, 573.4, 573.2, 573.3
See application file for complete search history.

(56) References Cited

U.S. PATENT DOCUMENTS 5,837,996 A * 11/1998 Keydar .................. 250/221
5,910,767 A *  6/1999 Frucht .................. 340/557
(Continued)

FOREIGN PATENT DOCUMENTS

EP    1 936 400    6/2008
GB    2 295 740    6/1996
WO    02/42792     5/2002

OTHER PUBLICATIONS

Writ of Opposition, European Patent Application No. 2 255 217, dated Feb. 12, 2014 (14 pages).
(Continued)

*Primary Examiner* — Que T Le
*Assistant Examiner* — Jennifer Bennett
(74) *Attorney, Agent, or Firm* — Burr & Brown, PLLC

(57) ABSTRACT

A sensor for monitoring a monitored area, having a transmitting unit which emits radiation, wherein the sensor is capable of detecting objects in the monitored area. According to the invention, the sensor comprises means, using which the instantaneous and/or average power per unit area applied to a detected object of energy incident on the object, such as electromagnetic radiation of the transmitting unit, can be determined. In addition, adaptation means are provided in order to not let the instantaneous and/or average power per unit area of energy incident on the object, such as electromagnetic radiation of the transmitting unit, exceed a predetermined value during the detection of an object in the monitored area, the sensor being configured to first measure whether objects are located in a predetermined proximal area to the transmitter unit using a comparatively low power which can create no or no noticeable hazard potential for people.

10 Claims, 3 Drawing Sheets

(51) Int. Cl.
*G01S 17/02* (2006.01)
*G01S 7/484* (2006.01)
*G01S 7/497* (2006.01)
*G01S 17/89* (2006.01)

(56) References Cited

U.S. PATENT DOCUMENTS

| | | | |
|---|---|---|---|
| 6,441,888 B1* | 8/2002 | Azuma et al. | 356/4.01 |
| 6,617,999 B2* | 9/2003 | Kondo et al. | 342/70 |
| 6,822,687 B1* | 11/2004 | Kakiuchi et al. | 348/348 |
| 6,879,384 B2* | 4/2005 | Riegl et al. | 356/5.01 |
| 7,499,638 B2* | 3/2009 | Arai et al. | 396/108 |
| 2004/0041997 A1* | 3/2004 | Uomori et al. | 356/3.01 |
| 2005/0185403 A1* | 8/2005 | Diehl | F41H 13/0081 362/259 |
| 2006/0109536 A1* | 5/2006 | Mettenleiter et al. | 359/196 |

OTHER PUBLICATIONS

"The Use of Lasers in the Workplace," Prepared by the International Non-Ionizing Radiation Committee of the International Radiation Protection Association in Collaboration with the International Labour Organization, 1993 (3 pages).

Henderson, A. Roy, "A Guide to Laser Safety," *Chapman & Hall*, 1997 (6 pages).

* cited by examiner

3-D SENSOR WITH ADAPTIVE TRANSMITTING POWER FOR MONITORING AN AREA

CROSS REFERENCE TO RELATED APPLICATIONS

This application is a continuation of International Application No. PCT/EP2009/002082 filed Mar. 20, 2009, which designated the United States, and claims the benefit under 35 USC §119(a)-(d) of German Application No. 10 2008 015 373.7 filed Mar. 20, 2008 and German Application No. 10 2008 032 405.1 filed Jul. 10, 2008, the entireties of which are incorporated herein by reference.

FIELD OF THE INVENTION

The invention relates to a sensor for monitoring a monitored area.

BACKGROUND OF THE INVENTION

From DE 20 2007 009 722, an optoelectronic device having an illumination device is known which has a coherent light source and an expansion device for expanding the light emitted by the light source in an expansion axis. Furthermore, the device has a housing with a front disk for the exit of light. The expansion device is arranged for expanding the light in such a manner, and/or the light source point of the light source is arranged with respect to the front disk in such a manner that in operation, the light in the expansion axis emerges over a large proportion of the width of the front disk in order to eliminate hazards due to light for people and their eyes.

The subject of eye-safety becomes more and more prominent with the increase in power of light sources, particularly infrared LEDs which are used for optoelectronic safety devices.

SUMMARY OF THE INVENTION

The invention is based on the object of providing a sensor for monitoring a monitored area which is improved further with regard to the safety of people, particularly eye-safety.

The invention is based on a sensor for monitoring a monitored area, having a transmitting unit which emits radiation, particularly electromagnetic radiation having a radiation power, or another energy wave, e.g. sound wave, wherein the sensor is capable of detecting objects in the monitored area.

The core of the invention then lies in the fact that the sensor comprises using means which the instantaneous and/or average power per unit area applied to a detected object of energy incident on the object or a quantity which allows conclusions to be drawn about this, can be determined and that adaptation means are provided in order to not let the instantaneous and/or average power per unit area of energy incident on the object, or else a quantity of energy incident on the object which allows conclusions to be drawn about this, e.g. electromagnetic radiation of the transmitter unit, to exceed a predetermined value during the detection of an object in the monitored area. The sensor is configured to first measure whether objects are located in a predetermined proximal area to the transmitting unit using a comparatively low power which can create no or no noticeable hazard potential for people. Comparatively low power can be understood to be such that in a predetermined hazard area, either no or no noticeable hazard arises for people because the power is too small or the distance to the person is too large.

If no objects are detected, the power is preferably increased, especially incrementally.

By this means, it becomes possible to keep a hazard potential for people who are irradiated by a transmitter of the transmitting unit within a tolerable range.

This is because the sensor recognizes virtually independently when it detects an object that, as a result, a fundamental hazard potential exists since the objects can be people, animals or sensitive objects, and ensures that the intensity of the radiation is kept within a non hazardous range.

This can relate to any electromagnetic radiation, e.g. microwave radiation or x-ray radiation, the spectrum of light in particular having priority for eye safety.

In monitoring the power per unit area, the maximum permissible power per unit area can be basically limited to a predetermined value during the detection of an object in order to eliminate unhealthy radiation.

However, it is also conceivable that the temporal integral of the power per unit area, that is to say the average power per unit area, is limited to a predetermined value. This is because, as a rule, high radiation peaks are not hazardous if their power is reduced rapidly enough.

Both approaches can be used alternatively or in combination for limiting power.

In particular, the standard EN 60825 is taken into consideration with regard to permissible intensities with respect to the safety of people. A radiated power should preferably be dimensioned in such a manner that a hazard potential does not arise with respect to the safety of people, especially at possible positions of an object with respect to the transmitting unit.

As soon as the sensor no longer detects an object, the intensity of the sensor can be increased.

Thus, any sensor can also be used with comparatively high intensity and no geometric adaptations to the housing are necessary which, as a rule, lead to the possibility that the housing cannot be kept small and esthetic.

In a further, particularly preferred embodiment of the invention, the sensor comprises a 3-D sensor which determines instantaneous and/or average power per unit area applied to a detected object. The power can be adapted to a predetermined level. In this context, the 3-D sensor can be used for detecting distance by utilizing the transmitting unit as radiation source for the distance measurement in order to determine the power per unit area of another transmitter, e.g. from the distance obtained and a known emission cone of the other transmitter and its delivered power and/or in order to be able to monitor the transmitting unit for the distance measurement with regard to power per unit area arriving at an object. The transmitting unit can be arranged in a constructional unit with the 3-D sensor for distance measurement. A separate construction is also conceivable. In principle, a number of transmitting units can be provided, wherein only a single transmitting unit, which possibly forms one construction unit with the 3-D sensor, can be used for a distance measurement. If the sensor has a number of transmitting units, it can be used for monitoring one or more transmitting units. In this arrangement, the transmitting units can emit radiations of a different physical nature. For example, one sensor according to the invention, which has a transmitter in the infrared range, can monitor a sound source with respect to its power per unit area arriving at an object.

When light is used, high safety with regard to eyes can be guaranteed according to the invention.

Furthermore, it is preferred if an adaptation of the average power per unit area over the number of measurements per unit time can be achieved by means of the adaptation means or, in principle, over the time of irradiation.

For example, during the detection of an object, less measurement is carried out per unit time, with the power of the transmitting unit always remaining the same. Thus, the average power per unit area is reduced and can thus be kept below a hazardous value. The sensor thus simply scans the monitored area more slowly, the basic functionality and power remaining unchanged.

However, it is also conceivable that, via the adaptation means, a transmitter of the transmitting unit, preferably all transmitters of the transmitting unit, can be reduced in power. Thus, e.g., a reduction in the intensity on an object can be achieved by reducing the transmitting power, the scanning rate remaining unchanged. An increase in the sensitivity of a receiving unit of the sensor is likewise conceivable so that it is possible to work with reduced power.

In a particularly preferred embodiment of the invention, the adaptation means are designed for reducing the power of, or completely switching off, at least one transmitter of the transmitting unit which irradiates a detected object. In the case of a number of transmitters of the transmitting unit, transmitters which do not irradiate the object can thus continue to operate unchanged and detect objects in the remaining monitored area.

A further possibility of influencing the power per unit area on an object consists of at least one transmitter of the transmitting unit is covered with an adjustable diaphragm means. By this means, it is possible, e.g. to shade an area of the monitored area in which an object is detected. Correspondingly, an excessive dose of radiation can be avoided for the object in this area. This area can comprise, e.g. a person, possibly the head of a person or only the eyes of the person.

In the extreme case, monitoring can continue with undiminished power in the case of a precise determination of the object if, e.g., only the eyes of a person are shaded by a variable light valve. For example, a matrix display based on LCD technology can be used for this purpose.

The teachings according to the invention can be used for all types of sensors which are based on reflection. For example, light scanners or camera-based sensors with illumination. The use of time of flight or transit-time arrays is conceivable, by means of which pixel-related distances of a scene can be detected, a transmitter illuminating the scene with its light. The use of cameras is also conceivable, which only record images such as, e.g., photo and film cameras. If there is an illumination, the teaching according to the invention can also be used, e.g. for triangulation sensors and stereo cameras.

In addition, sensors can be used which are not based on reflection. For example, a receiver is allocated to a transmitter of the transmitting unit in the manner of a light barrier. If necessary, a number of such light barriers are provided.

To avoid endangering objects, particularly people and animals, it is also proposed that the sensor is configured for first measuring with a comparatively low power which cannot create a hazard potential whether there are objects located within a predetermined proximal area of the transmitting unit.

Furthermore, it is especially preferred if the current of a transmitter of the transmitting unit is adjustable. It is comparatively simple to control the current through a transmitter. Since sensors in most cases switch already when there is only one object in the detection area, it is no problem that remote objects are no longer detected with reduced transmitting power. The sensor responds equally quickly, only its sensitivity is restricted. Thus, the most important functions are regularly available unrestrictedly even if, e.g., the long-range detection must be omitted in this measuring state.

The current can be adjusted at a transmitter. e.g. via transistors, field-effect transistors or varistors which are arranged in the current path of the transmitter. These elements are cost-effective, easy to drive and can continuously adjust or even completely switch off the current.

The invention can be applied to all areas of optical sensors including door and gate and safety areas. The procedure according to the invention can also be used for "games", e.g. game consoles, in medical applications, smoke sensors and on robots. Furthermore, one field of application is machines, mobile telephones and iris scanners to name only a selection of possibilities. An application in devices for sight improvement in vehicles, e.g. in night-vision devices or in equipment for monitoring the internal space of vehicles is also conceivable.

As already stated, the invention is not limited to the spectrum of light with regard to the transmitting unit but can extend to any type of electromagnetic radiation emitted by the transmitting unit.

In an also preferred embodiment of the invention, the sensor is capable of distinguishing people from other objects. In this case, the process of limiting the power per unit area is only initiated in the case of a detection of people, the sensor continuing with normal power in the case of other objects. Apart from people, a differentiation can also be carried out with respect to animals. Limiting the power per unit area can also conceivably be adapted in particular only with regard to areas which allow inferences with respect to a power per unit area at one eye and/or preferably only check the power per unit area with reference to one eye. The background for this is that eyes normally represent the most sensitive areas for too much light power also in the infrared range.

Furthermore, it is preferred if an output is provided which signals that the sensor is operated with restricted power. It can output a warning signal such as, e.g., an acoustic signal, a text or light signal which causes the endangered person to move away from the sensor. E.g., the acoustic or optical signal can be so unpleasant that one moves away automatically from the sensor or a person directs his line of sight into another, harmless direction. A warning signal as electrical signals, e.g. to a higher-level control system, is also conceivable.

Since infrared light is not visible to humans, there is no eye reflex. According to the invention, visible light can be used for delivering a warning signal which is so bright that it causes the desired eye reflex.

During a measurement, a light source for visible light can be switched on. The intensity of the visible light is preferably selected in such a manner that an eye reflex occurs. However, the total intensity of visible and non-visible light should not exceed a critical limit. This can be achieved, e.g., by controlling the intensity of the visible light and of the non-visible light over time in such a manner that the total intensity remains constant. For example, the two are sinusoidally modulated with a phase shift of 180°. The two sources can also be operated in time-division multiplex.

Such a manner of controlling the intensity is basically possible without any regulation taking place or the distance from the sensor to objects being determined.

BRIEF DESCRIPTION OF THE DRAWINGS

In the text which follows, an exemplary embodiment of the invention will be explained in greater detail with reference to the attached FIGURE.

DETAILED DESCRIPTION OF THE INVENTION

Figure 1:
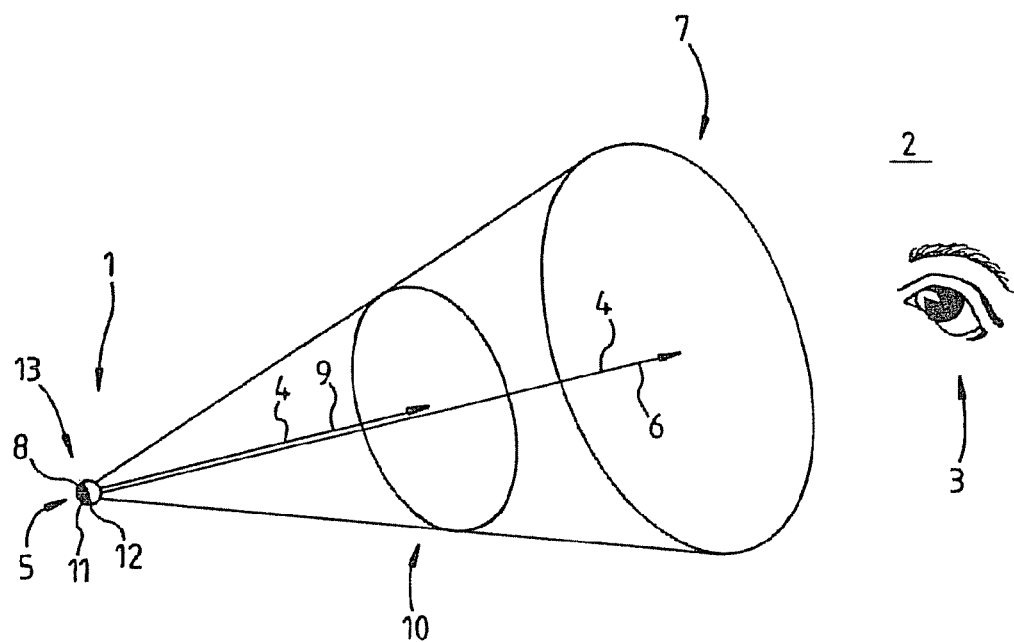
FIG. 1 shows a sensor for monitoring a monitored area.
Figure 2:
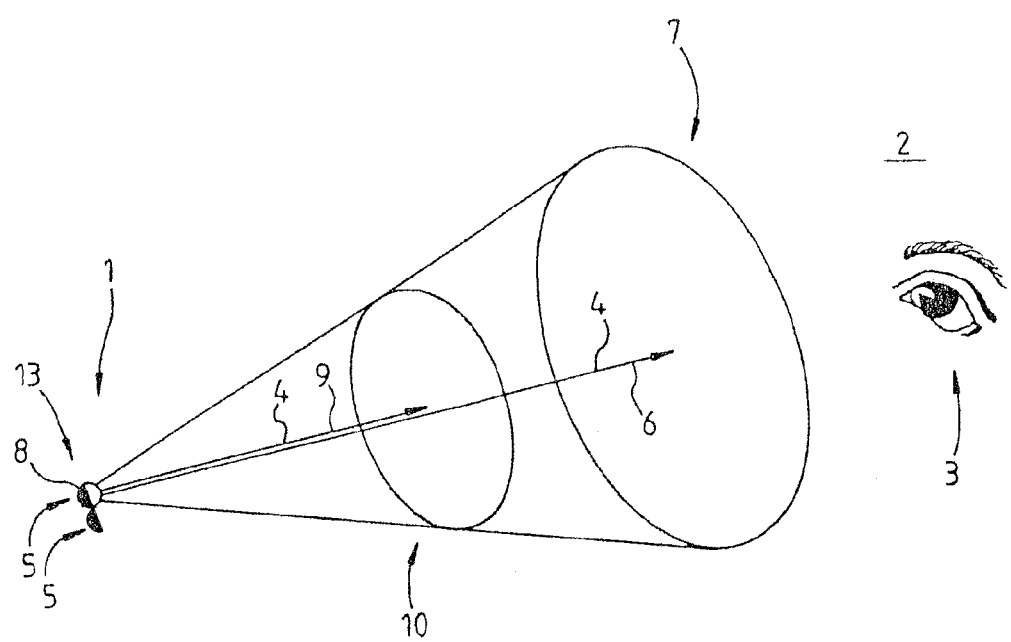
FIG. 2 shows a sensor with a separate transmitting unit for determining distance in one embodiment of the present invention.
Figure 3:
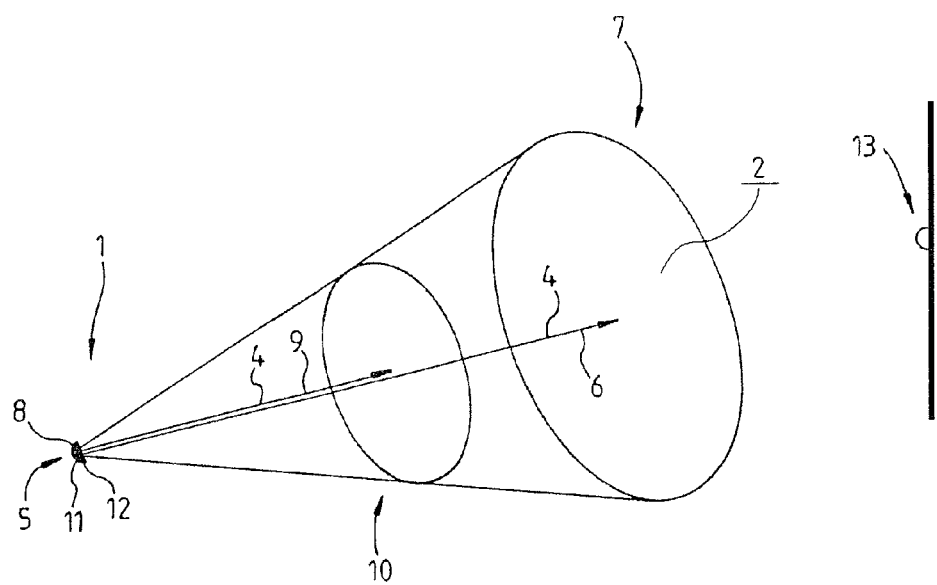
FIG. 3 shows a sensor arranged as a light barrier in one embodiment of the present invention.

FIG. 1 shows a sensor 1 by means of which a monitored area 2 is to be monitored to see whether an object 3 is located therein. For this purpose, the sensor 1 is provided with a transmitting unit 5 suitable for emitting a radiation 4, especially an electromagnetic radiation and/or also an acoustic radiation.

To be able to ensure reliable detection of objects in the monitored area 2 to be monitored, the transmitting power of the transmitting unit 5 can be operated with a comparatively high radiation power in times in which no object is detected in the monitored area. For example, in order to be able to ensure that reliable object detection can be guaranteed also in possibly covered and/or not easily visible monitored areas.

By way of example and symbolically, this radiation power is represented by the vector arrow 6 coming from the transmitting unit 5. The energy of, e.g., light in the infrared range, incident on the object 3, e.g., an eye, during this process corresponds, for example, to the length of the vector arrow 6. To represent the energy incident on the object 3 with this transmitting power more three-dimensionally, a circle 7 drawn around the point of the arrow is used which is shown as an ellipse in accordance with a perspective view and the area of which appropriately reflects this amount of energy.

To ensure that a detected object 3 is not irradiated with too much energy over a longer term, the sensor 1 comprises a 3-D sensor 8 suitable for detecting the radiation energy applied to the detected object. In a particularly preferred manner, this 3-D sensor can initiate an adaptation of the transmitting power, particularly its reduction, on the basis of the detected result and a predetermined value for a maximum permissible irradiation of an object.

A corresponding maximum permissible transmitting power, and/or one which has been reduced in this manner, of the radiation 4 delivered by the transmitting unit 5 is again shown by way of example and symbolically by the vector arrow 9 or, respectively, as area of the circle 10 for a more three-dimensional illustration. E.g., the reduced transmitting power is not harmful to the human eye even if it is irradiated directly.

In order to be able to adapt the transmitting power of the transmitting unit 5, adaptation means 11 can be provided which in this case are represented by way of example and symbolically by a solid semicircle 12 and can be implemented, e.g., in the form of a diaphragm 12.

The adaptation means can also be configured in such a manner that a detection of people and animals such as, e.g., dogs and cats is possible. Advantageously, the transmitting power is then not reduced with the detection of each object but only if a person or an animal is detected.

In a preferred manner, a transmitter of the transmitting unit 5, together with a receiver 13, can form a light barrier arrangement which in a particularly preferred manner can be used for detecting the energy incident on the detected object.

LIST OF REFERENCE DESIGNATIONS

1 Sensor
2 Monitored area
3 Object
4 Radiation
5 Transmitting unit
6 Vector arrow
7 Circle
8 3-D sensor
9 Vector arrow
10 Circle
11 Adaptation means
12 Diaphragm
13 Receiver

We claim:

1. A sensor for monitoring a monitored area comprising:
   a transmitting unit which emits radiation having a known emission cone to detect an object within the monitored area;
   a 3-D sensor for detecting distance and determining, from a distance obtained and the known emission cone, one of an instantaneous power per unit area and an average power per unit area of energy incident on the object within the monitoring area; and
   adaptation means which do not let one of the instantaneous power per unit area and the average power per unit area of energy incident on the object exceed a predetermined value during the detection of the object in the monitored area,
   wherein the sensor first measures whether the object is located in a predetermined proximal area to the transmitting unit using a low transmitting power which minimizes any hazard potential for people, and when no object is located in the predetermined proximal area, the sensor incrementally increases a transmitting power of the transmitting unit to measure whether the object is located within predetermined distances farther from the transmitting unit.

2. The sensor as claimed in claim 1, wherein the sensor uses the transmitting unit for determining the distance from an object.

3. The sensor as claimed in claim 1, wherein the sensor uses a further transmitting unit for determining the distance from an object.

4. The sensor as claimed in claim 1, wherein the average power per unit area is adapted over one of a number of measurements per unit time and over a measuring period with a radiating transmitting unit.

5. The sensor as claimed in claim 1, wherein at least one of a power of a transmitter of the transmitting unit is reduced and a sensitivity of a receiving unit of the sensor is increased via the adaptation means.

6. The sensor as claimed in claim 1, wherein the adaptation means comprises adjustable diaphragm means that cover at least a portion of a transmitter of the transmitting unit.

7. The sensor as claimed in claim 1, wherein a transmitter of the transmitting unit with a receiver forms an arrangement in the manner of a light barrier.

8. The sensor as claimed in claim 1, wherein the current of a transmitter of the transmitting unit is adjustable.

9. The sensor as claimed in claim 1, wherein the sensor is configured such that it is capable of distinguishing people from other objects.

10. The sensor as claimed in claim 1, wherein the low transmitting power eliminates any hazard potential for people.

* * * * *